United States Patent [19]

Inoue

[11] Patent Number: 5,420,884
[45] Date of Patent: May 30, 1995

[54] AUTOMATIC EQUALIZER

[75] Inventor: Yutaka Inoue, Tokyo, Japan

[73] Assignee: Canon Kabushiki Kaisha, Tokyo, Japan

[21] Appl. No.: 863,736

[22] Filed: Apr. 6, 1992

[30] Foreign Application Priority Data

| Apr. 11, 1991 | [JP] | Japan | 3-078034 |
| Apr. 16, 1991 | [JP] | Japan | 3-082744 |
| Apr. 26, 1991 | [JP] | Japan | 3-095969 |

[51] Int. Cl.$^6$ .................................... H03H 7/30
[52] U.S. Cl. ......................... 375/229; 364/724.19
[58] Field of Search .................. 375/11, 12, 13, 14, 375/15; 333/18, 28 R; 364/724.19, 724.2

[56] References Cited

U.S. PATENT DOCUMENTS

| 4,245,320 | 1/1981 | Desblache | 375/12 |
| 4,555,788 | 11/1985 | Merrill | 375/11 |
| 4,567,599 | 1/1986 | Mizoguchi | 333/18 |
| 4,635,276 | 1/1987 | Karabins | 375/14 |
| 4,797,898 | 1/1989 | Martinez | 375/12 |

FOREIGN PATENT DOCUMENTS

| 0434584 | 6/1991 | European Pat. Off. |
| 0000216 | 1/1984 | Japan |
| 0075135 | 4/1985 | Japan |

Primary Examiner—Stephen Chin
Attorney, Agent, or Firm—Fitzpatrick, Cella, Harper & Scinto

[57] ABSTRACT

Disclosed is an automatic equalizer which, through a simple and inexpensive arrangement, performs precise equalization irrespective of timing phase error at the time of transmission. Specifically, there is provided an automatic equalizer for equalizing received data, which has a data transmission interval T, by a predetermined equalization characteristic, including a plurality of automatic equalizing units for performing equalization at different timings within the data transmission interval T. During training, the optimum automatic equalizing unit is found and this equalizing unit is used in subsequent data reception. Disclosed methods of finding the optimum automatic equalizing unit include a method of comparing equalization error signals with one another, and a method of comparing the error signals with a threshold value and using the automatic equalizing unit whose error signal in equal to or less than the threshold value. Disclosed methods of selection include a method of selecting a transversal filter and a method of selecting an equalized output. Also disclosed is a control algorithm for a case in which two automatic equalizing units are used as the preferred number of units. Complicated phase timing control is not required, and highly precise equalization with little equalization error can be carried out.

15 Claims, 9 Drawing Sheets

AUTOMATIC EQUALIZER

BACKGROUND OF THE INVENTION

1. Field of the Invention

This invention relates to an automatic equalizer and, more particularly, to an automatic equalizer for equalizing, by a predetermined equalizing characteristic, received data having a data transmission interval T.

2. Description of the Related Art

A modem of a facsimile apparatus or various types of data terminals capable of performing high-speed (4800 bps) data communication using an analog line such as a telephone line usually is provided with an equalizer for eliminating signal distortion caused by the transmission line and performing equalizing by following up a change in such distortion with the passage of time.

Figure 8:
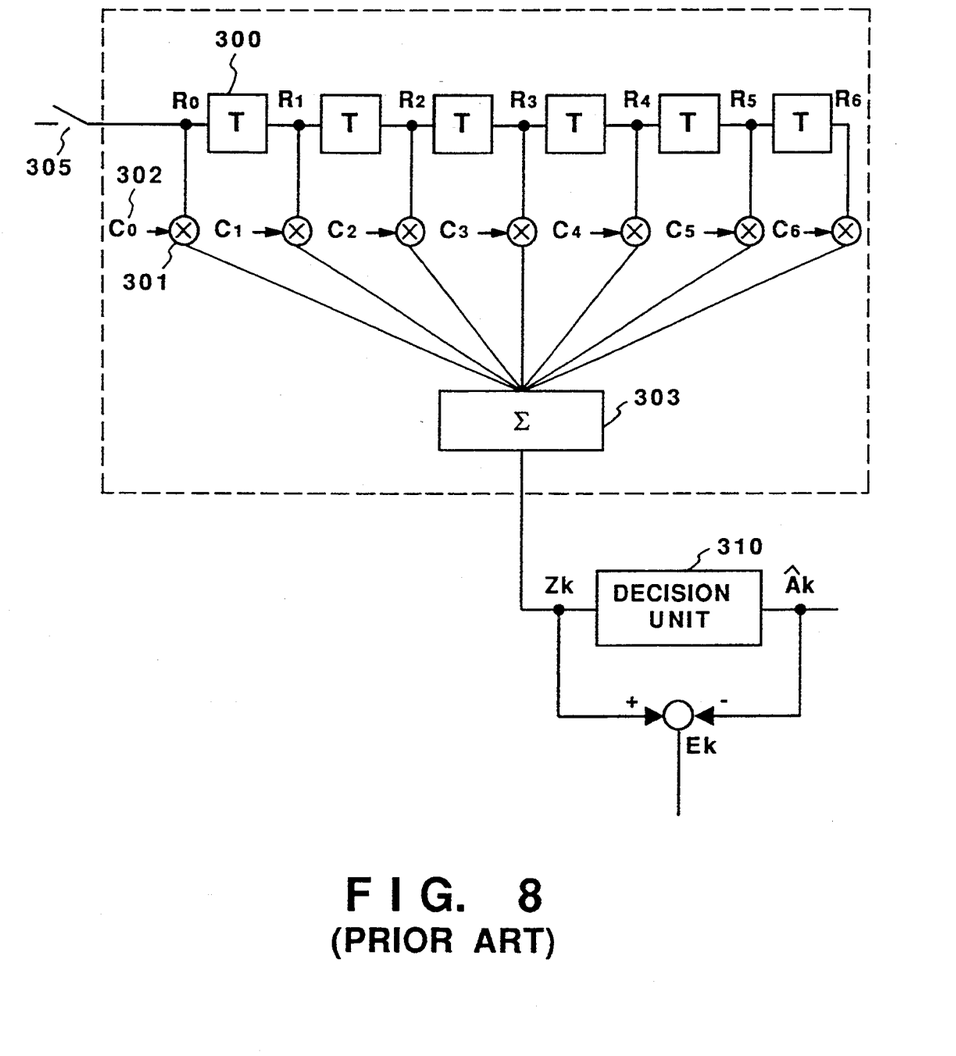
FIG. 8 is a block diagram illustrating the basic construction of an equalizer according to the prior art.

FIG. 8 illustrates the construction of the equalizer section of a conventional modem.

In FIG. 8, the portion enclosed by the dashed line represents a transversal filter of an automatic equalizer. The transversal filter comprises a plurality of cascade-connected data delay elements 300 (each having a unit time delay of T seconds), multipliers 301 for multiplying items of delay data ($R_0 \sim R_6$) by respective tap coefficients 302 ($C_0 \sim C_6$), and an adder 303 for calculating the sum total of the products provided by the aforementioned multipliers. The adder 303 produces an output $Z_k$, which is indicative of the sum total calculated. This signal becomes the output of the transversal filter.

In a modem having such a transversal filter, training data, which is predetermined between the transceiving apparatus, is received to set the tap coefficients before a data transmission is made. This is followed by making the transition to data transmission.

During the transmission of the training data and the transmission of ordinary data, the automatic 5 equalizer updates the tap coefficients 302 ($C_m$: $C_0 \sim C_6$) and generates equalizer characteristics for the purpose of eliminating distortion in accordance with the following equation:

$$C_m = C_m - \alpha R_m^* \cdot E_k \quad (1)$$

where

α: corrective coefficient $R_m^*$: complex conjugate of input signal R $E_k$: error signal ($E_k = Z_k - A_k$)

Here the error signal $E_k$ is the difference between the adder output $Z_k$ and the result $A_k$ of discrimination performed by a decision unit 310. The value of $A_k$ is known during the aforementioned training. Reference numeral 305 denotes a sampling switch for sampling an input signal, which comprises an interval of less than T seconds, upon subdividing the signal at the time delay of T seconds of the equalizing delay elements.

An important factor which decides the characteristics of the automatic equalizer is timing phase error. Timing phase error will be described in simple terms with reference to FIG. 9.

Figure 9:
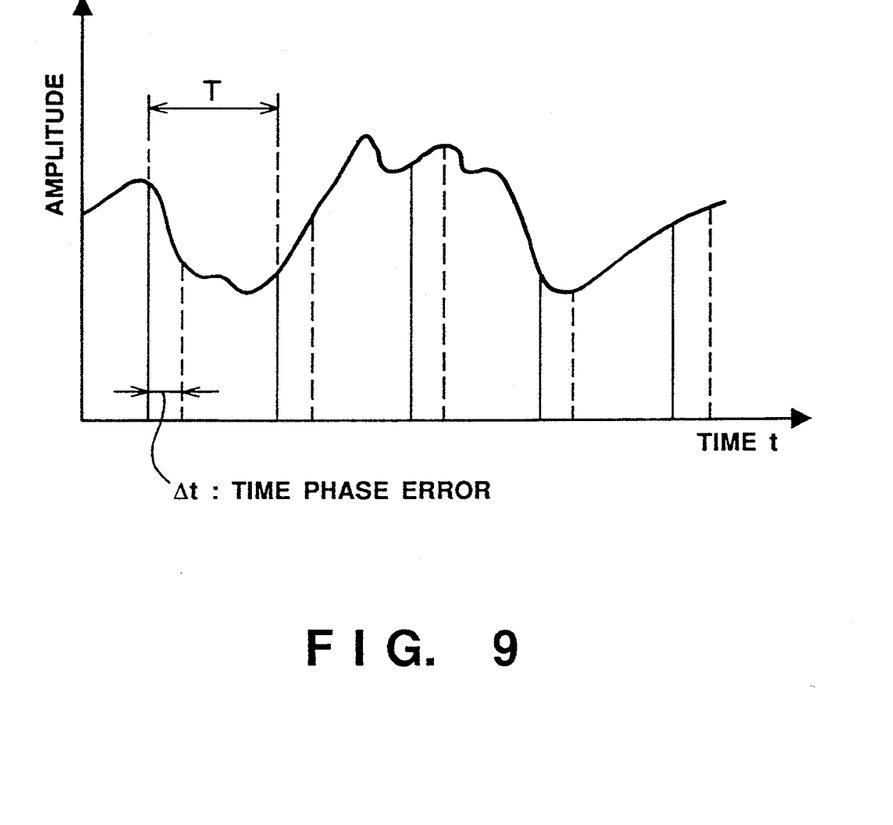
FIG. 9 is a diagram showing problems encountered in the equalizer according to the prior art.

FIG. 9 illustrates the transmission waveform of a baseband. The timing of the vertical lines represented by the solid lines indicates data points actually transmitted. The spacing between neighboring solid vertical lines corresponds to the data transmission interval (the so-called baud rate) T.

On the receiving side, this waveform is received and equalized. In actuality, however, data is not received precisely at the normal T interval as indicated by the solid vertical lines but often is received at a timing offset from the normal timing, as indicated by the dashed vertical lines. This offset Δt from the normal timing is the aforementioned timing phase error.

Since the equalizer (whose unit time delay is T seconds) shown in FIG. 8 equalizes this timing phase error as well, it goes without saying that equalization precision is greatly affected by the amount of phase error.

In general, equalization precision declines as the timing phase error Δt increases. It is known that reliable equalization can no longer be performed when the timing phase error attains a value of T/2.

In order to eliminate the drawback in the prior art, timing phase control means is provided for extracting a timing signal from the received signal and synchronizing equalization processing to the transmission timing. However, in order to extract a timing signal from transmitted data and control the phase of reception timing reliably, the control means required is of considerable complexity.

SUMMARY OF THE INVENTION

An object of the present invention is to provide an automatic equalizer capable of performing accurate equalization, through a simple and inexpensive arrangement, with regard to a timing phase error at the time of transmission.

According to the present invention, the foregoing object is attained by providing an automatic equalizer for equalizing received data, which has a data transmission interval T, by a predetermined equalization characteristic, comprising at least two automatic equalizing means for performing equalization at different timings within the data transmission interval T, and equalizing-means selecting means for accumulating average error of equalized results from each of the automatic equalizing means after reception starts, and selecting whichever of the automatic equalizing means affords the smallest average error so that the selected automatic equalizing means performs subsequent equalization processing.

In a case where n-number of the automatic equalizing means are provided, the timing becomes a phase shifted by T/n, wherein the apparatus further 0 comprises input control means for inputting the received data to each of the automatic equalizing means at the timing shifted by T/n.

In another aspect of the invention, there is provided an automatic equalizer for equalizing received data, which has a data transmission interval T, by a predetermined equalization characteristic, comprising n- number of automatic equalizing means, distributing means for inserting any of the n-number of automatic equalizing means in a signal path at a timing phase T/n, error calculating means for obtaining equalization errors in outputs from respective ones of the automatic equalizing means every T/n in time, and selecting means for comparing average errors of the n-number of automatic equalizing means and selecting whichever of the automatic equalizing means has the smallest average error, wherein, after data reception starts, the distributing means successively inserts each of the automatic equalizing means into the signal path by a prescribed point time measured in synchronization with arrival of the received data, the selecting means selects an optimum one of the automatic equalizing means, and equalization is performed using the selected automatic equalizing means after the prescribed point time.

In accordance with the above-described arrangement, n-number of automatic equalizers whose transmission times are offset by exactly T/n are used to evaluate equalization performance, and then the automatic equalizer having the best performance is selected. This makes possible highly precise equalization.

In still another aspect of the invention, there is provided an automatic equalizer for equalizing received data, which has a data transmission interval T, by a predetermined equalization characteristic, comprising n-number of automatic equalizing means, distributing means for inserting any of the n-number of automatic equalizing means in a signal path at a timing phase T/n, error calculating means for obtaining equalization errors in outputs from the automatic equalizing means every T/n in time, and selecting means for comparing average errors of the n-number of automatic equalizing means with a predetermined threshold value and selecting whichever of the automatic equalizing means first provides an average error that is equal to or less than the predetermined threshold value, wherein, after data reception starts, the distributing means successively inserts each of the automatic equalizing means into the signal path, the selecting means selects an optimum one of the automatic equalizing means, and equalization is performed using the selected automatic equalizing means after selection processing ends.

In accordance with the above-described arrangement, n-number of automatic equalizers whose transmission times are offset by exactly T/n are used to evaluate equalization performance by comparing the average errors and the threshold value, and then the automatic equalizer having the best performance, namely that which first outputted an average error to or less than the predetermined threshold value, is selected. This makes possible highly precise equalization.

In a further aspect of the invention, there is provided an automatic equalizer for equalizing received data, which has a data transmission interval T, by a predetermined equalization characteristic, comprising n-number of automatic equalizing means, distributing means for inserting any of the n-number of automatic equalizing means in a signal path at a timing phase T/n, error calculating means for obtaining equalization errors in outputs from the automatic equalizing means every T/n in time, and selecting means for comparing average errors of the n-number of automatic equalizing means and selecting and outputting an output from whichever of the n-number of automatic equalizing means has the smallest average error.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The present invention will now be described in detail with reference to the embodiments described in the drawings.

First Embodiment

Figure 1:
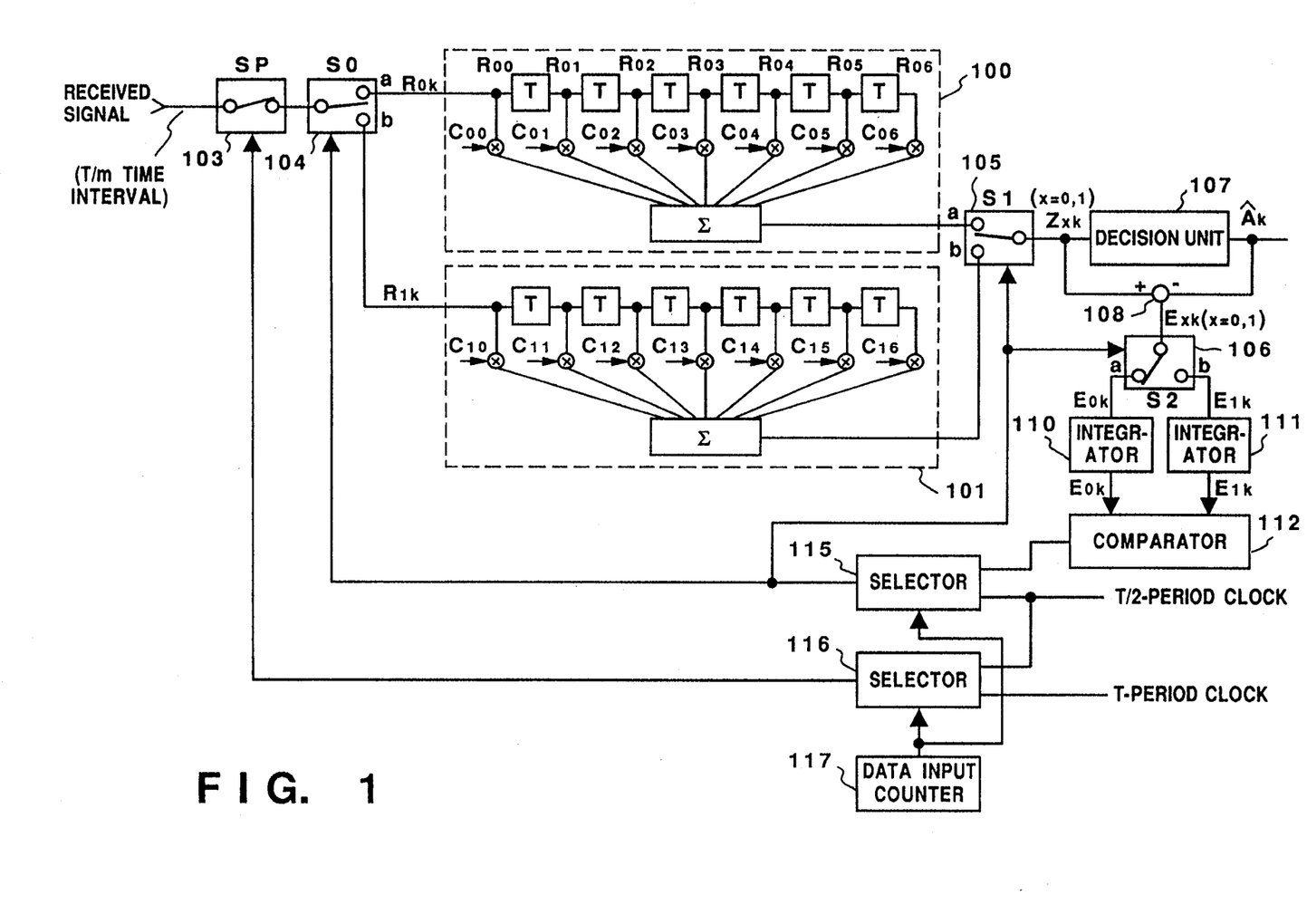
FIG. 1 is a block diagram illustrating an automatic equalizer according to a first embodiment of the present invention.

In FIG. 1, the portions enclosed by the dashed lines represent automatic equalizers each comprising a transversal filter similar to that of the prior-art example in FIG. 8. Two equalizers indicated at numerals 100 and 101 are used in the invention.

Received signals RT/m which arrive at a time interval T/m (n>2) are sampled at a time interval T/2 by a sampler 103 which, in the initial state, is set to sample at T/2. Signals RT/2n are thus extracted and are applied to a distribution switch (SO) 104 which, in the initial state, is changed over between a and b sides at the time interval T/2. The distribution switch 104 thus distributes the signals RT/2n as RT/2n (where n is an even number), hereinafter designated $R_{0k}$, and RT/2n (where n is an odd number), hereinafter designated $R_{1k}$. The signals $R_{0k}$ and $R_{1k}$ enter the automatic equalizers 100, 101, respectively. Thus, the signals inputted to the automatic equalizers 100 and 101 are signals offset from each other by exactly the time interval T/2.

The automatic equalizers 100, 101 receive their input signals and perform equalization in parallel (i.e., independently). The outputs of the automatic equalizers 100, 101 also are delivered exactly at the interval T/2 and are fed into a decision unit 107 at the interval T/2 by a switch (S1) 105 similar to the switch 104. The decision unit 107 delivers a decision value every T/2 in time. When training is being performed, $A_{xk}$ is known data every T seconds, and $A_k$ maintains the same value for T seconds ($A_{0k} = A_{1k}$).

The output of the decision unit 107 and the outputs of the automatic equalizer 100, 101 are applied to an error calculating unit (adder) 108, which outputs an error signal every T/2 in time. Error signals $E_{0k}$ resulting from the automatic equalizer 100 and error signals $E_{1k}$ resulting from the automatic equalizer 101 are obtained by a switch 106 similar to the switches 104, 105. The error signals $E_{0k}$, $E_{1k}$ are integrated by respective integrators 110, 111 over any interval (e.g., 8T), whereby average error signals are calculated. A comparator 112 compares the average error signals and outputs an equalizer selection signal, which is for the purpose of delivering the smaller error.

A counter 117 counts the number of items of data input thereto. When the counted recorded by the counter 117 is equal to or less than a set number (e.g., the number of modem training cycles), a selector 115 selects a clock having a period of T/2 and delivers this signal to the switches 104, 105 and 106, which therefore are changed over at the period of T/2. A selector 116 also selects the clock having the period of T/2 and delivers this signal to the switch 103, which therefore functions as a T/2 sampler.

When the count in the counter 117 exceeds the set value, the selector 115 selects the output of the comparator 112, namely the equalizer selection signal, so that the switches 104, 105 and 106 are changed over solely to the a side or b side. The selector 116 selects a clock having a period of T, rather than the T/2 period clock, so that the sampler 103 functions as a T sampler.

Thus, when the value in the counter 117 is equal to or less than the set value, the automatic equalizers 100, 101 operate in parallel. When the value in the counter 117 exceeds the set value, however, the automatic equalizer exhibiting the smaller error at this time is selected and, from this point onward, data transmission equalized by the selected automatic equalizer is performed.

Figure 2:
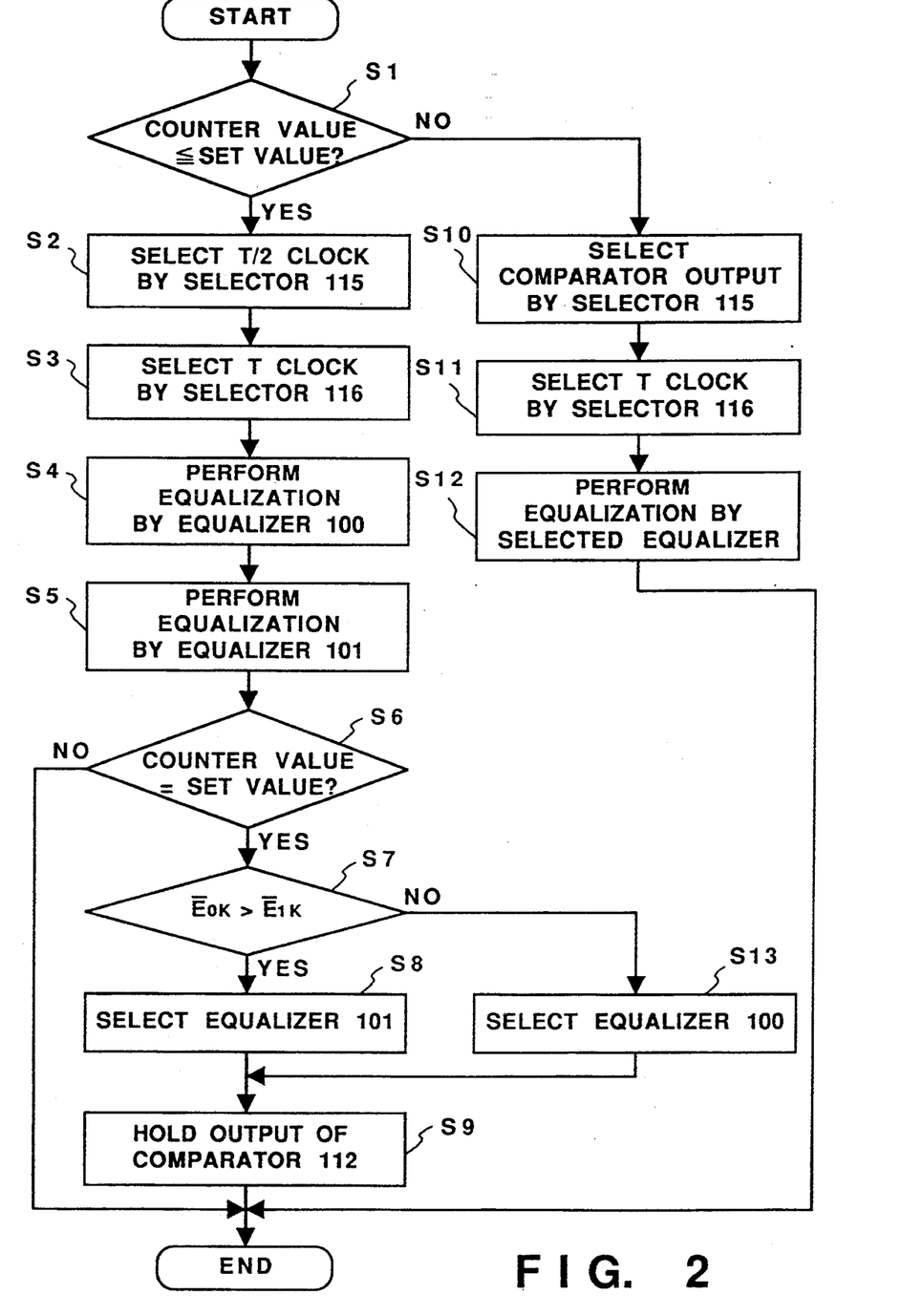
FIG. 2 is a flowchart illustrating the control procedure of the equalizer shown in FIG. 1.

The criteria for updating the tap coefficients of the automatic equalizers 100, 101 are as follows:

equalizer 100: $C_{0m} = C_{0m} - \alpha R_{0m}^* \cdot E_{0k}$
equalizer 101: $C_{1m} = C_{1m} - \alpha R_{1m}^* \cdot E_{1k}$ FIG. 2 illustrates the operation of the apparatus shown in FIG. 1. The control procedure of FIG. 2 can be implemented as a control program such as a digital signal processor (DSP) constituting the apparatus of FIG. 1.

In FIG. 2, step S1 calls for a decision regarding the value of the count in the data input counter 117. If the value of the count is equal to or less than the set value, steps S2 through S9 and step S13 are executed. These steps continue to be executed until a prescribed period of time (the training period, etc.) elapses at step S1.

At steps S2 through S5, the automatic equalizer 100, 101 are alternately selected at the T/2 time interval, and it is determined again at step S6 whether the prescribed period of time has elapsed. If elapse of the prescribed time period is confirmed, then selection of one of the automatic equalizers 100, 101 is performed by the comparator 112 at steps S7 through S9 and step S13.

Steps S10 through S12 illustrate processing executed after elapse of the prescribed time period has been confirmed by the data input counter 117. In this processing, the optimum automatic equalizer is selected by the selectors 115, 116 in dependence upon the results of the selection made by the comparator 112 at steps S7~S9, S13.

Thus, two equalizers offset from each other by exactly T/2 seconds in terms of operation are used to evaluate their equalizing performance, and the equalizer having the higher performance is selected. As a result, highly precise equalization is assured at all times irrespective of timing phase error at the time of transmission. It is possible to carry out a high-quality data transmission through a simple and inexpensive arrangement in which complicated timing phase control means is unnecessary.

Though the foregoing embodiment is described with regard to an example in which two equalizers are used, this does not impose a limitation upon the invention, for i-number of equalizers may be employed. This can readily be achieved by switching over the sampler 103 from a T/i sampler to the T sampler in the manner described above, replacing the switches 104, 105 and 106 by switches changed over to a, b, c, . . . i every T/i seconds, and providing i-number of comparators for comparing i-number of items of data. This would make it possible to select the most precise equalizer from a greater number of equalizers so as to achieve an even more accurate data transmission. If i is made too large however, the construction of the apparatus would become more complicated and high-speed equalization calculation would be required. For this reason, it is believed that i should be on the order of 2.

Though the method of least mean square algorithm (LMS) is employed as the equalizing algorithm in the foregoing embodiment, it goes without saying that this does not impose a limitation upon the present invention.

Thus, as should be apparent from the foregoing, this embodiment of the invention provides an automatic equalizer for equalizing received data, which has a data transmission interval T, by a predetermined equalization characteristic, comprising n-number of automatic equalizing means, distributing means for inserting any of the n-number of automatic equalizing means in a signal path at a timing phase T/n, error calculating means for obtaining equalization errors in outputs from respective ones of the automatic equalizing means every T/n in time, and selecting means for comparing average errors of the n-number of automatic equalizing means and selecting whichever of the automatic equalizing means has the smallest average error, wherein, after data reception starts, the distributing means successively inserts each of the automatic equalizing means into the signal path by a prescribed point time measured in synchronization with arrival of the received data, the selecting means selects an optimum one of the automatic equalizing means, and equalization is performed using the selected automatic equalizing means after the prescribed point time. As a result, by a simple and inexpensive arrangement which does not require complicated timing phase control means, highly precise equalization becomes possible at all times irrespective of timing phase error at the time of transmission, and a high-quality data transmission is capable of being carried out.

Second Embodiment

Figure 3:
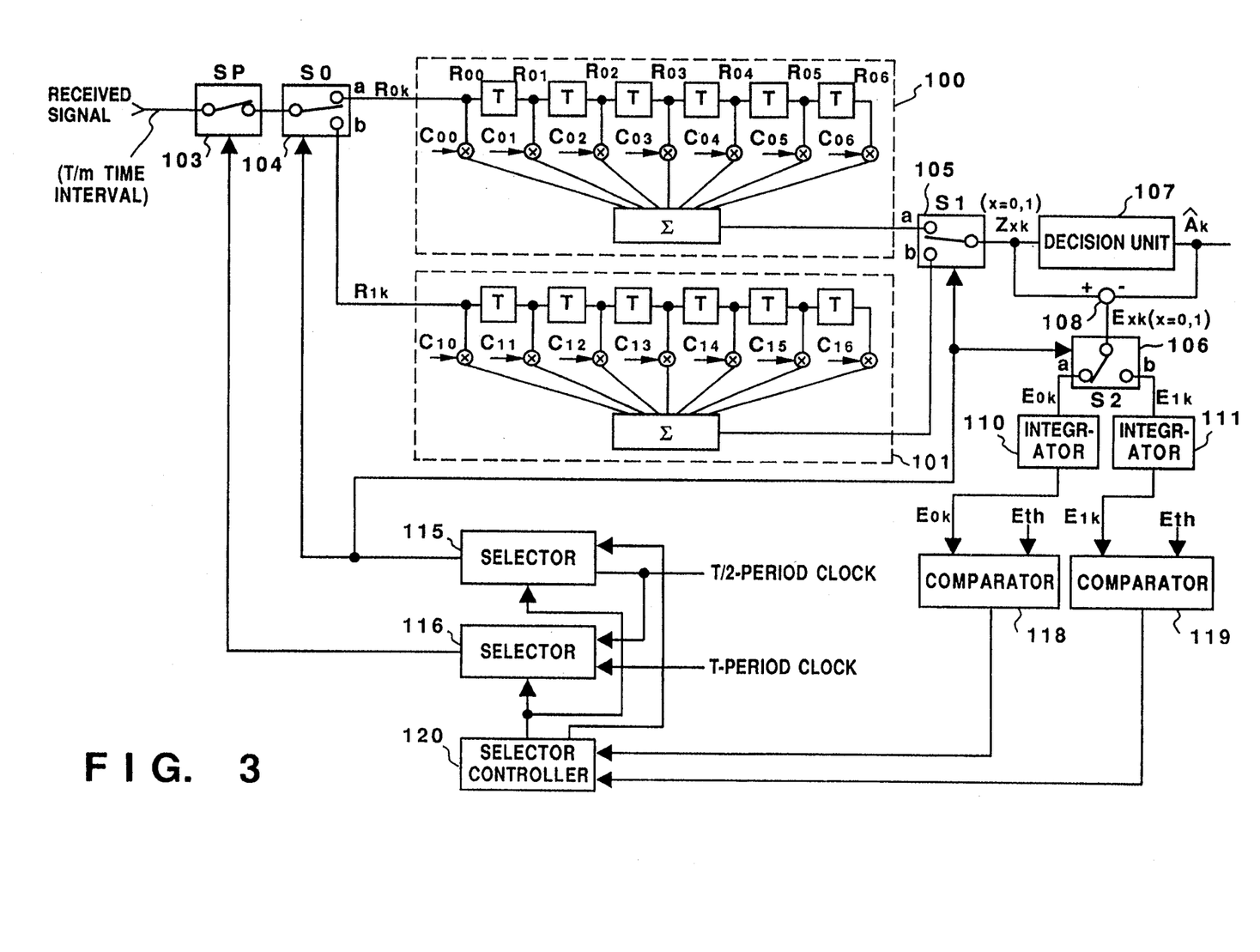
FIG. 3 is a block diagram illustrating an automatic equalizer according to a second embodiment of the present invention.

FIG. 3 is a block diagram showing the construction of an automatic equalizer according to a second embodiment of the invention. Reference characters identical with those shown in FIG. 1 designate elements having the identical functions. Operation up to calculation of the average error signals in the integrators 110, 111 is the same as in the first embodiment.

In the second embodiment, the results of averaging error are compared with a predetermined threshold value $E_{th}$ in comparators 118, 119. The results of comparison from the comparators 118, 119 are inputted to a selector controller 120.

If the average values of $E_{0k}$, $E_{1k}$ outputted by the respective integrators 110, 111 are both equal to or greater than the threshold value $E_{th}$, the selector controller 120 delivers a T/2 clock selection signal to the selectors 115, 116, in response to which the selectors select the clock having the period of T/2.

Figure 5:
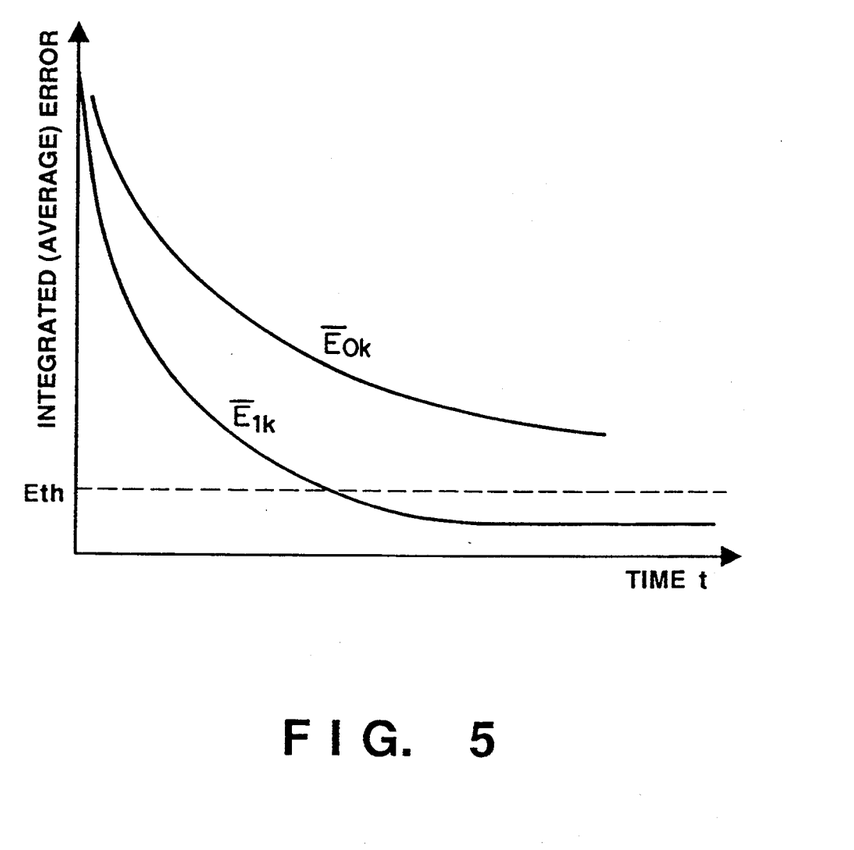
FIG. 5 is a diagram showing a change in the average error of the automatic equalizer illustrated in FIG. 3.

On the other hand, if one of the average values (average errors) of $E_{0k}$, $E_{1k}$ falls below the threshold value $E_{th}$, i.e., if the average value of $E_{1k}$ falls below $E_{th}$ before the average value of $E_{0k}$ does, as shown in FIG. 5, the selector controller 120 provides the selector 115 with a signal for selecting whichever equalizer (100 or 101) generates an error less than the threshold value $E_{th}$. The selector 115 then sends the switch 104 a selection signal for selecting the equalizer indicated by the equalizer selection switch from the selector controller 120. Similarly, the selector controller 120 sends the selector 116 a selection signal for selecting the clock having the period T.

Accordingly, the outputs of the selectors 115, 116 are the equalizer selection signal and T-period clock, respectively, the sampler 103 operates as a T-second sampler, and the switches 104, 105, 106 are fixed at the a side or b side in accordance with the selection signal.

The selector controller 120 functions so as to hold its output fixed if the above-mentioned selection has been performed one time. From this point onward, therefore, signal equalization is performed solely by one of the equalizers.

Figure 4:
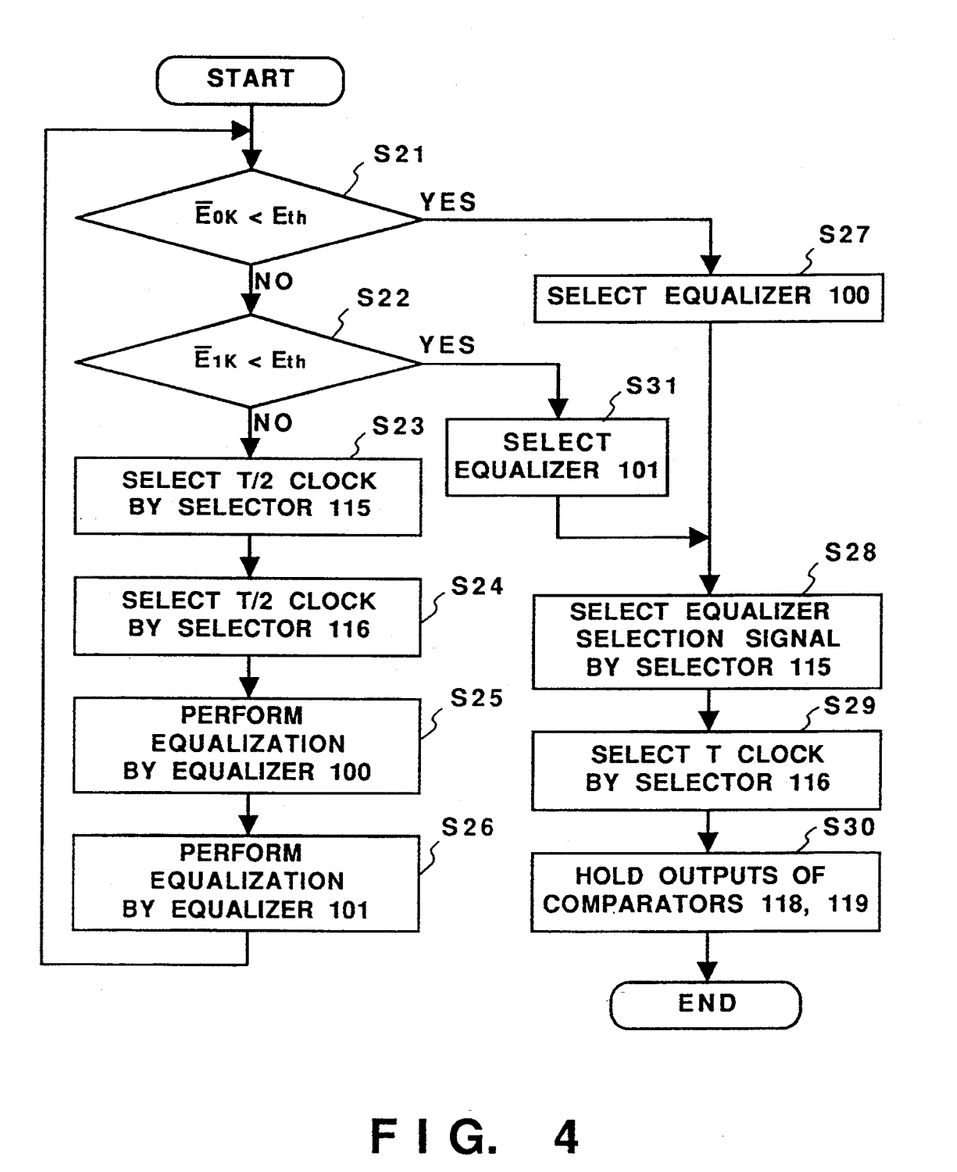
FIG. 4 is a flowchart illustrating the control procedure of the equalizer shown in FIG. 3.

FIG. 4 illustrates the operation of the apparatus shown in FIG. 3. The control procedure of FIG. 4 can be implemented as a control program such as a DSP constituting the apparatus of FIG. 3. The processing of FIG. 4 is executed when the equalizer is adjusted.

Steps S21 and S22 in FIG. 4 illustrate the operation of the comparators 118, 119. When the average values of $E_{1k}$, $E_{0k}$ are both equal to or greater than the threshold value $E_{th}$, the clock having the period of T/2 is selected by the selectors 23, 24 so that equalization is performed while the automatic equalizers 100, 101 are changed over in alternating fashion at the interval T/2.

If the average value of $E_{0k}$ becomes smaller than $E_{th}$ before the average value of $E_{1k}$ does at step S21 in the above-described equalizer adjustment loop, the program proceeds to step S27, at which the automatic equalizer 100 is selected. If the average value of $E_{1k}$ becomes smaller than $E_{th}$ before the average value of $E_{0k}$ does at step S22 in the above-described equalizer adjustment loop, the program proceeds to step S31, at which the automatic equalizer 101 is selected.

At steps S28, S29 and S30, selection of the equalizer by the selector 115, the changeover from the T/2 clock to the T clock by the selector 116, and the holding of the outputs of the comparators 118, 119 are performed, after which a transition is made to equalization processing.

Thus, two equalizers offset from each other by exactly T/2 seconds in terms of operation are used to evaluate their equalizing performance, and the equalizer having the higher performance is selected. As a result, highly precise equalization is assured at all times irrespective of timing phase error at the time of transmission. It is possible to carry out a high-quality data transmission through a simple and inexpensive arrangement in which complicated timing phase control means is unnecessary.

Furthermore, since the equalizer whose average error first falls below the threshold value is selected, the equalizer selected is that which performs equalization at the higher speed. This makes it possible to perform a data transmission at a higher speed and with a high throughput.

Though the foregoing embodiment is described with regard to an example in which two equalizers are used, this does not impose a limitation upon the invention, for i-number of equalizers may be employed. This can readily be achieved by switching over the sampler 103 from a T/i sampler to the T sampler in the manner described above, replacing the switches 104, 105 and 106 by switches changed over to a, b, c, . . . i every T/i seconds, and providing i-number of comparators for comparing i-number of items of data. This would make it possible to select the most precise equalizer from a greater number of equalizers so as to achieve an even more accurate data transmission. If i is made too large however, the construction of the apparatus would become more complicated and high-speed equalization calculation would be required. For this reason, it is believed that i should be on the order of 2.

Though the method of least mean squares (LMS) is employed as the equalizing algorithm in the foregoing embodiment, it goes without saying that this does not impose a limitation upon the present invention.

Thus, as should be apparent from the foregoing, this embodiment of the invention provides an automatic equalizer for equalizing received data, which has a data transmission interval T, by a predetermined equalization characteristic, comprising n-number of automatic equalizing means, distributing means for inserting any of the n-number of automatic equalizing means in a signal path at a timing phase T/n, error calculating means for obtaining equalization errors in outputs from the automatic equalizing means every T/n in time, and selecting means for comparing average errors of the n-number of automatic equalizing means with a predetermined threshold value and selecting whichever of the automatic equalizing means first provides an average error that is equal to or less than the predetermined threshold value, wherein, after data reception starts, the distributing means successively inserts each of the automatic equalizing means into the signal path, the selecting means selects an optimum one of the automatic equalizing means, and equalization is performed using the selected automatic equalizing means after selection processing ends. As a result, by a simple and inexpensive arrangement which does not require complicated timing phase control means, highly precise equalization becomes possible at all times irrespective of timing phase error at the time of transmission, and a high-quality data transmission is capable of being carried out. Furthermore, since the equalizer whose average error first falls below the threshold value is selected, the equalizer selected is that which performs equalization at the higher speed. This makes it possible to perform a data transmission at a higher speed and with a high throughput.

Third Embodiment

Figure 6:
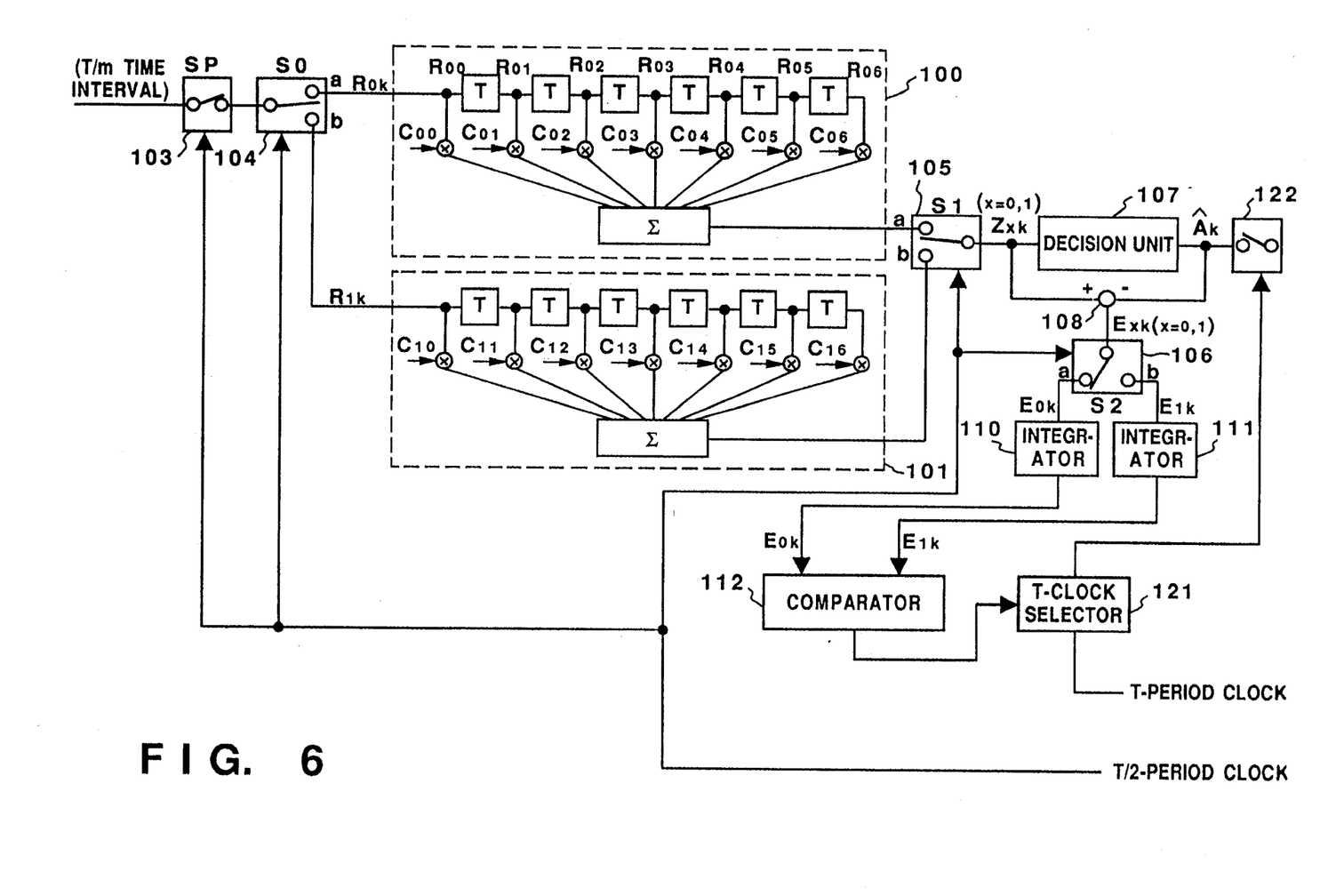
FIG. 6 is a block diagram illustrating an automatic equalizer according to a third embodiment of the present invention.

FIG. 6 is a block diagram showing the construction of an automatic equalizer according to a third embodiment of the invention. Reference characters identical with those shown in FIG. 1 or FIG. 3 designate elements having the identical functions.

In FIG. 6, the equalizer selection signal from the comparator 112 is connected to a T-period clock selector 121. If, by way example, the equalizer selection signal selects the automatic equalizer 100, the T-period clock selector 121 the T-period clock as is. If the automatic equalizer 101 is selected, on the other hand, the selector 121 outputs the T-period clock upon shifting its phase by 180°.

The output signal from the clock selector 121 is inputted to a switch 122, which is closed only when this signal is, for example, at a high logic level. More specifically, only the equalizer output signal of the automatic equalizer having the smaller average error (the smaller of the average values of $E_{0k}$, $E_{1k}$ compared by the comparator 112) is outputted to a decoder (not shown) or the like and is finally delivered to an external device data terminal equipment (DTE), such as a facsimile machine.

Figure 7:
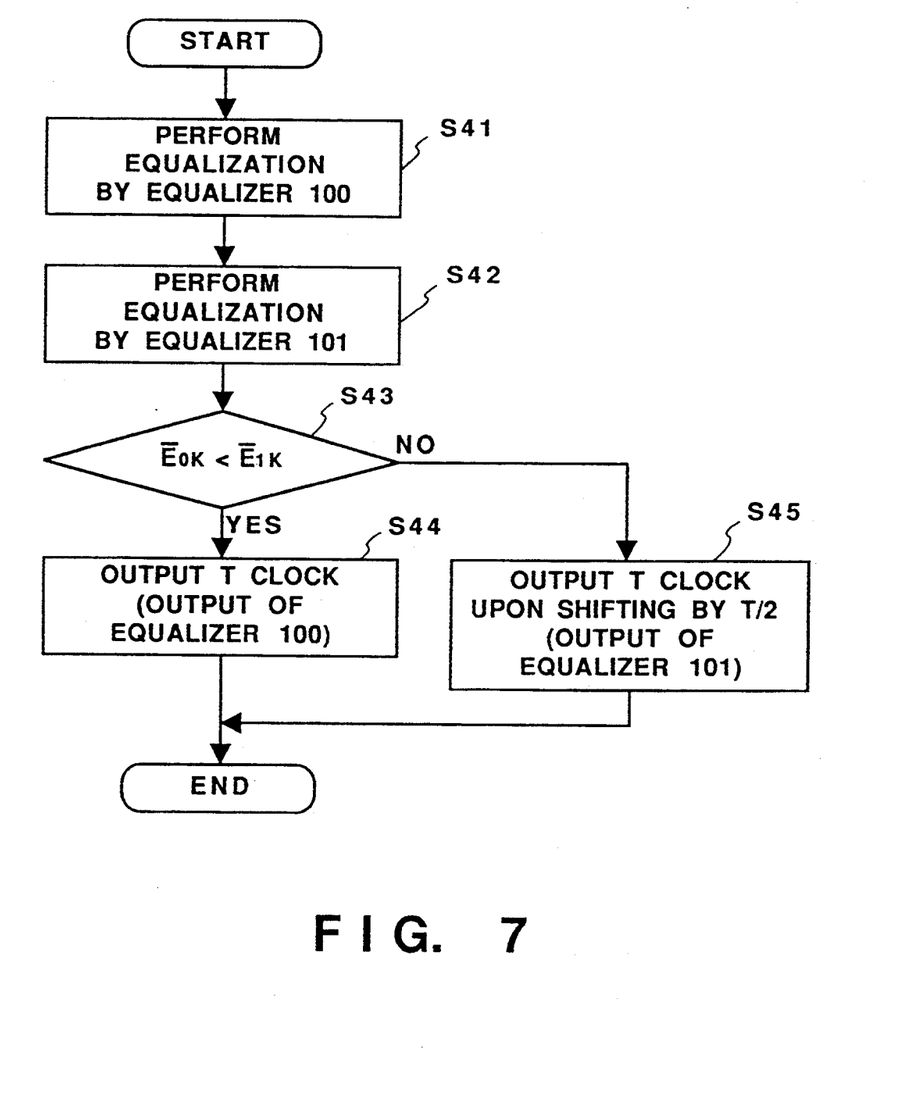
FIG. 7 is a flowchart illustrating the control procedure of the equalizer shown in FIG. 3.

FIG. 7 illustrates the operation of the apparatus shown in FIG. 7. The control procedure of FIG. 7 can be implemented as a control program such as a DSP constituting the apparatus of FIG. 6.

In FIG. 7, steps S41 and S42 illustrate processing in which the automatic equalizers 100, 101 are selected in alternating fashion at the time interval T/2. Steps S43 through S45 illustrate processing in which the output of the clock selector 121 is inverted by the comparator 112.

Thus, two equalizers offset from each other by exactly T/2 seconds in terms of operation are used to evaluate their equalizing performance, and the equalizer having the higher performance is selected. As a result, highly precise equalization is assured at all times irrespective of timing phase error at the time of transmission. It is possible to carry out a high-quality data transmission through a simple and inexpensive arrangement in which complicated timing phase control means is unnecessary.

Furthermore, since the equalizer having the higher performance is always employed, equalization can be performed without being significantly affected by a timing phase which varies with the passage of time (i.e., by a timing frequency error).

Though the foregoing embodiment is described with regard to an example in which two equalizers are used, this does not impose a limitation upon the invention, for i-number of equalizers may be employed. This can readily be achieved by switching over the sampler 103 from a T/i sampler to the T sampler in the manner described above, replacing the switches 104, 105 and 106 by switches changed over to a, b, c, ... every T/i seconds, and providing i-number of comparators for comparing i-number of items of data. This would make it possible to select the most precise equalizer from a greater number of equalizers so as to achieve an even more accurate data transmission. If i is made too large however, the construction of the apparatus would become more complicated and high-speed equalization calculation would be required. For this reason, it is believed that i should be on the order of 2.

Though the method of least mean squares (LMS) is employed as the equalizing algorithm in the foregoing embodiment, it goes without saying that this does not impose a limitation upon the present invention.

Thus, as should be apparent from the foregoing, this embodiment of the invention provides an automatic equalizer for equalizing received data, which has a data transmission interval T, by a predetermined equalization characteristic, comprising n-number of automatic equalizing means, distributing means for inserting any of the n-number of automatic equalizing means in a signal path at a timing phase T/n, error calculating means for obtaining equalization errors in outputs from the automatic equalizing means every T/n in time, and selecting means for comparing average errors of the n-number of automatic equalizing means and selecting and outputting an output from whichever of the n-number of automatic equalizing means has the smallest average error. As a result, by a simple and inexpensive arrangement which does not require complicated timing phase control means, highly precise equalization becomes possible at all times irrespective of timing phase error at the time of transmission, and a high-quality data transmission is capable of being carried out.

As many apparently widely different embodiments of the present invention can be made without departing from the spirit and scope thereof, it is to be understood that the invention is not limited to the specific embodiments thereof except as defined in the appended claims.

What is claimed is:

1. An automatic equalizer for equalizing received data, which has a data transmission interval T, by a predetermined equalization characteristic, comprising:

at least two automatic equalizing means for performing equalization at different timings within the data transmission interval T; and equalizing-means selecting means for accumulating average error of equalized results from each of said automatic equalizing means after data reception starts, and selecting whichever of the automatic equalizing means affords the smallest average error to perform subsequent equalization processing.

2. The automatic equalizer according to claim 1, wherein, in a case where n-number of said automatic equalizing means are provided, the timing becomes a phase shifted by T/n;

the apparatus further comprising input control means for inputting the received data to each of said automatic equalizing means at the timing shifted by T/n.

3. An automatic equalizer for equalizing received data, which has a data transmission interval T, by a predetermined equalization characteristic, comprising:

n-number of automatic equalizing means;

distributing means for inserting any of said n-number of automatic equalizing means in a signal path at a timing phase T/n;

error calculating means for obtaining equalization errors in outputs from respective ones of said automatic equalizing means every T/n in time; and selecting means for comparing errors of said n-number of automatic equalizing means and selecting whichever of the automatic equalizing means has the smallest error;

wherein after data reception starts, said distributing means successively inserts each of said automatic equalizing means into the signal path by a prescribed point time measured in synchronization with arrival of the received data, said selecting means selects one of said automatic equalizing means, and equalization is performed using the selected automatic equalizing means after the prescribed point time.

4. An automatic equalizer for equalizing received data, which has a data transmission interval T, by a predetermined equalization characteristic, comprising:

n-number of automatic equalizing means;

distributing means for inserting any of said n-number of automatic equalizing means in a signal path at a timing phase T/n;

error calculating means for obtaining equalization errors in outputs from said automatic equalizing means every T/n in time; and selecting means for comparing errors of said n-number of automatic equalizing means and selecting and outputting an output from whichever of said n-number of automatic equalizing means has the smallest error.

5. An automatic equalizer for equalizing received data, which has a data transmission interval T, by a predetermined equalization characteristic, comprising:

n-number of automatic equalizing means;

distributing means for inserting any of said n-number of automatic equalizing means in a signal path at a timing phase T/n;

error calculating means for obtaining equalization errors in outputs from said automatic equalizing means every T/n in time; and selecting means for comparing errors of said n-number of automatic equalizing means with a predetermined threshold value and selecting whichever of the automatic equalizing means first provides an error that is equal to or less than the predetermined threshold value;

wherein after data reception starts, said distributing means successively inserts each of said automatic equalizing means into the signal path, said selecting means selects one of said automatic equalizing means, and equalization is performed using the selected automatic equalizing means after selection processing ends.

6. An equalizing method for equalizing received signals, comprising the steps of:

providing a plurality of equalizing means with received signals at different timings;

comparing errors of the plurality of equalizing means to produce a comparison result;

selecting one of the plurality of equalizing means in accordance with the comparison result; and outputting a signal as an equalized signal from the selected equalizing means.

7. The method according to claim 6, wherein the signals received by each of the plurality of equalizing means are obtained by sampling a signal at its specific timing.

8. The method according to claim 6, wherein in the selecting step, an equalizing means having the smallest error is selected.

9. The method according to claim 6, wherein in the comparing step, integral values obtained by integrating the errors of the plurality of equalizing means respectively are compared.

10. The method according to claim 6, wherein in the comparing step, each of the errors of the plurality of equalizing means is compared with a predetermined threshold value, and in the selecting step, an equalizing means of which an error meets the predetermined threshold value is selected.

11. A receiving apparatus comprising:

a plurality of equalizing means each of which equalizes received signals at different timings;

discriminating means for discriminating errors of the plurality of equalizing means;

selecting means for selecting one of the plurality of equalizing means by comparing the errors of the plurality of equalizing means; and facsimile means for receiving an output of the equalizing means selected by said selecting means.

12. The apparatus according to claim 11, wherein each of the plurality of equalizing means receives signals obtained by sampling a received signal at its specific timing.

13. The apparatus according to claim 11, wherein said selecting means selects an equalizing means having the smallest error.

14. The apparatus according to claim 11, wherein said selecting means includes integrating means for integrating the errors of the plurality of equalizing means respectively.

15. The apparatus according to claim 11, wherein said selecting means selects an equalizing means of which an error meets a predetermined threshold value.

* * * * *

UNITED STATES PATENT AND TRADEMARK OFFICE
CERTIFICATE OF CORRECTION

PATENT NO. : 5,420,884
DATED : May 30, 1995
INVENTOR(S) : Yutaka Inoue

It is certified that error appears in the above-indentified patent and that said Letters Patent is hereby corrected as shown below:

COLUMN 1

Line 37, "5" should be deleted;

Line 48, "$A_k$)" should read --$\hat{A}_k$)--;

Line 50, "$A_k$" should read --$\hat{A}_k$--; and

Line 51, "$A_k$" should read --$\hat{A}_k$--.

COLUMN 2

Line 45, "0" should be deleted; and

Line 52, "n- num-" should read --n-num- --.

COLUMN 4

Line 28, "T/m(n>2)" should read --T/m(m$\geq$2)--;

Line 48, $A_{xk}$" should read --$\hat{A}_{xk}$--;

Line 49, "$A_k$" should read --$\hat{A}_k$--;

Line 50, "($A_{0k} = A_{1k}$)" should read --($\hat{A}_{0k} = \hat{A}_{1k}$)--;

Line 52, "equalizer" should read --equalizers--; and

Line 65, "counted" should read --count--.

UNITED STATES PATENT AND TRADEMARK OFFICE
CERTIFICATE OF CORRECTION

PATENT NO. : 5,420,884
DATED : May 30, 1995
INVENTOR(S) : Yutaka Inoue

It is certified that error appears in the above-indentified patent and that said Letters Patent is hereby corrected as shown below:

COLUMN 5

Line 34, "equalizer" should read --equalizers--.

COLUMN 7

Line 25, "selectors 23, 24" should read --selectors 115 and 116 in steps 523 and 524--.

COLUMN 8

Line 57, "selector 121" should read --selector 121 outputs--.

UNITED STATES PATENT AND TRADEMARK OFFICE
CERTIFICATE OF CORRECTION

PATENT NO. : 5,420,884
DATED : May 30, 1995
INVENTOR(S) : Yutaka Inoue

It is certified that error appears in the above-indentified patent and that said Letters Patent is hereby corrected as shown below:

COLUMN 9

Line 4, "FIG. 7." should read --FIG. 3.--; and
Line 35, "a,b,c,..." should read --a,b,c,...i--.

Signed and Sealed this

Fifth Day of December, 1995

BRUCE LEHMAN

Attest:

Attesting Officer

Commissioner of Patents and Trademarks